L. SANDERS,

Assignor to E. SANDERS.

WAIST BELT.

No. 10,612. Reissued June 16, 1885.

WITNESSES

Fred. W. Rosenbaum.

Carl Kay

INVENTOR

Louis Sanders

By his Attorneys

Fowler & Raegener

N. PETERS, Photo-Lithographer, Washington, D. C.

UNITED STATES PATENT OFFICE.

LOUIS SANDERS, OF BROOKLYN, ASSIGNOR TO ELIZA SANDERS, OF NEW YORK, N. Y.

WAIST-BELT.

SPECIFICATION forming part of Reissued Letters Patent No. 10,612, dated June 16, 1885.

Original No. 312,168, dated February 10, 1885. Application for reissue filed March 24, 1885.

*To all whom it may concern:*

Be it known that I, LOUIS SANDERS, of Brooklyn, in the county of Kings and State of New York, have invented certain new and useful Improvements in Waist-Belts, of which the following is a specification.

This invention has reference to an improved lady's waist-belt which can be readily adjusted to any size of waist, and which presents a neat and finished appearance.

Figure 1:
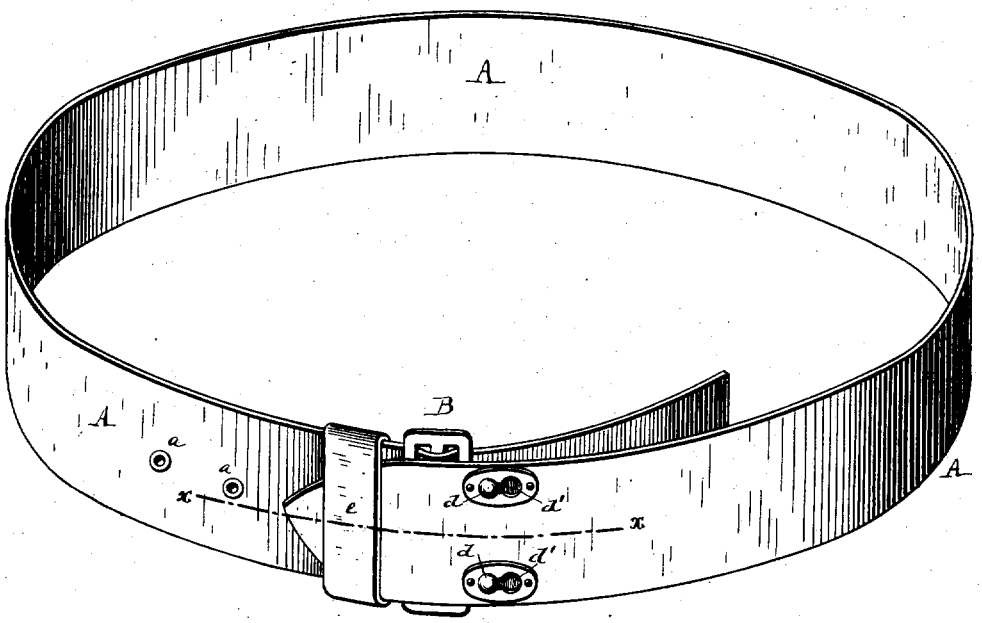
Figure 2:
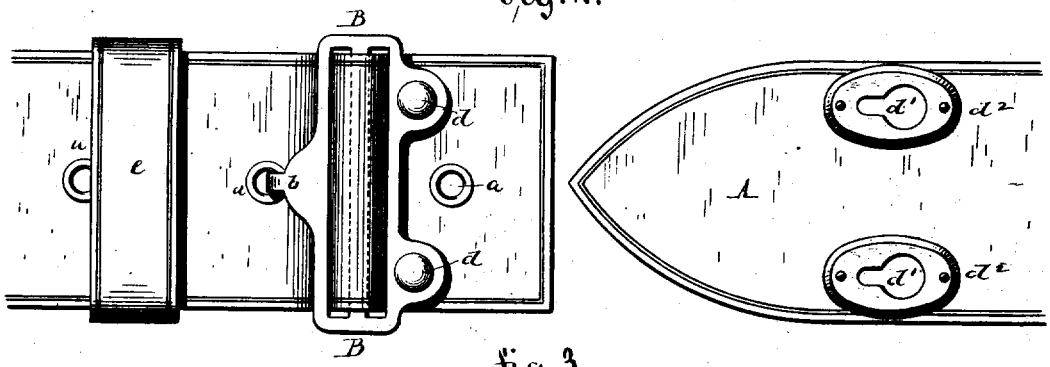
Figure 3:
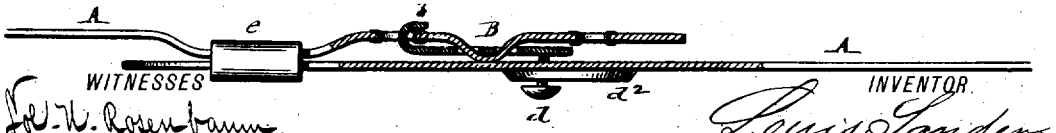

In the accompanying drawings, Figure 1 represents a perspective view of my improved lady's waist-belt. Fig. 2 is a detail side view of the inner and outer ends of the same, and Fig. 3 is a detail horizontal section of the buckle on line *x x*, Fig. 1.

Similar letters of reference indicate corresponding parts.

A in the drawings represents a lady's waist-belt, which is provided at the inner end with a series of holes, *a*, re-enforced by eyelets, and with an adjustable buckle, B, that is slipped by its center bar over the belt and provided at one side with a backwardly-projecting hook-shaped tongue, *b*, that is inserted into one of the holes *a*. The buckle B is further provided at its opposite side with forward-projecting headed studs *d d*, which take into slots *d′ d′* of the opposite or front end of the belt A. The slots *d′ d′* are re-enforced by a metal plate or plates, $d^2$, the slots being wide enough at one end for the passage of the heads of the studs *d d* and narrower at the other end for the shanks of the same. A sliding loop, *e*, is placed over the outer end of the belt after the same has been closed.

Having thus described my invention, I claim as new and desire to secure by Letters Patent—

1. A belt having a series of eyelets near one end, in combination with an adjustable sliding plate provided with an inwardly-turned hook for engaging said eyelets, a loop on the inside of the plate for holding the plate to the belt-strap, and a headed projection on the outside of the plate for engaging the other end of the belt, substantially as described.

2. The combination of a belt, provided at its outer end with a fixed slotted metallic plate and at its inner end with a series of holes, and an adjustable buckle, consisting of a plate provided on its under side with a loop, through which the belt passes, at its rear edge with an inwardly-projecting hook, which grasps said belt through one of said holes, and on its face or front side with outwardly-projecting headed studs, which interlock with said fixed slotted plate, substantially as set forth.

In testimony that I claim the foregoing as my invention I have signed my name in presence of two subscribing witnesses.

LOUIS SANDERS.

Witnesses:

PAUL GOEPEL,

SIDNEY MANN.